(12) United States Patent
Griffin et al.

(10) Patent No.: US 8,600,460 B2
(45) Date of Patent: Dec. 3, 2013

(54) HANDHELD ELECTRONIC COMMUNICATION DEVICE INCLUDING TOUCH-SENSITIVE DISPLAY AND METHOD

(75) Inventors: Jason Tyler Griffin, Kitchener (CA); Todd Andrew Wood, Guelph (CA)

(73) Assignee: Blackberry Limited, Waterloo (CA)

( * ) Notice: Subject to any disclaimer, the term of this patent is extended or adjusted under 35 U.S.C. 154(b) by 220 days.

(21) Appl. No.: 12/758,382

(22) Filed: Apr. 12, 2010

(65) Prior Publication Data

US 2011/0248933 A1 Oct. 13, 2011

(51) Int. Cl.
*H04M 1/00* (2006.01)
(52) U.S. Cl.
USPC .................................... 455/575.4; 345/905
(58) Field of Classification Search
USPC .................................................. 345/156–178
See application file for complete search history.

(56) References Cited

U.S. PATENT DOCUMENTS

| 7,235,738 | B2 | 6/2007 | Horinouchi et al. | |
|---|---|---|---|---|
| 2004/0229662 | A1 | 11/2004 | Chadha | |
| 2005/0105258 | A1* | 5/2005 | Tanaka et al. | 361/681 |
| 2005/0233785 | A1* | 10/2005 | Park et al. | 455/575.4 |
| 2005/0272487 | A1* | 12/2005 | Lee | 455/575.4 |
| 2006/0154619 | A1 | 7/2006 | Bae et al. | |
| 2006/0237209 | A1* | 10/2006 | Horinouchi et al. | 174/50 |
| 2007/0293283 | A1 | 12/2007 | Inubushi et al. | |
| 2008/0076480 | A1 | 3/2008 | Jeong et al. | |
| 2008/0299804 | A1 | 12/2008 | Ronkko et al. | |
| 2009/0144937 | A1 | 6/2009 | Jin et al. | |
| 2009/0186663 | A1 | 7/2009 | Griffin et al. | |
| 2009/0225039 | A1* | 9/2009 | Williamson et al. | 345/173 |
| 2009/0323278 | A1 | 12/2009 | Lu | |
| 2010/0066640 | A1* | 3/2010 | Wakefield | 345/1.1 |
| 2010/0159993 | A1* | 6/2010 | Davidson et al. | 455/566 |
| 2010/0178963 | A1* | 7/2010 | Iwaki | 455/575.4 |

FOREIGN PATENT DOCUMENTS

GB 2350516 A * 11/2000

OTHER PUBLICATIONS

The EESR dated Jul. 5, 2010, issued in respect of the corresponding European Patent Application No. 10159620.3.
Examiner's Report dated Jan. 16, 2013, issued from the corresponding Canadian patent application No. 2,733,376.

* cited by examiner

*Primary Examiner* — Rodney Amadiz
(74) *Attorney, Agent, or Firm* — Geoffrey deKleine; Borden Ladner Gervais LLP

(57) ABSTRACT

A handheld electronic communication device includes a body that has an input device, and a display assembly that includes a display. The display assembly is connected to the body and rotatable relative to the body, between a first position in which a first portion of the display is covered by the body and a second portion of the display extends from the body, and a second position in which the display is displaced generally linearly relative to the first position such that the first portion and the second portion of the display are exposed.

2 Claims, 11 Drawing Sheets

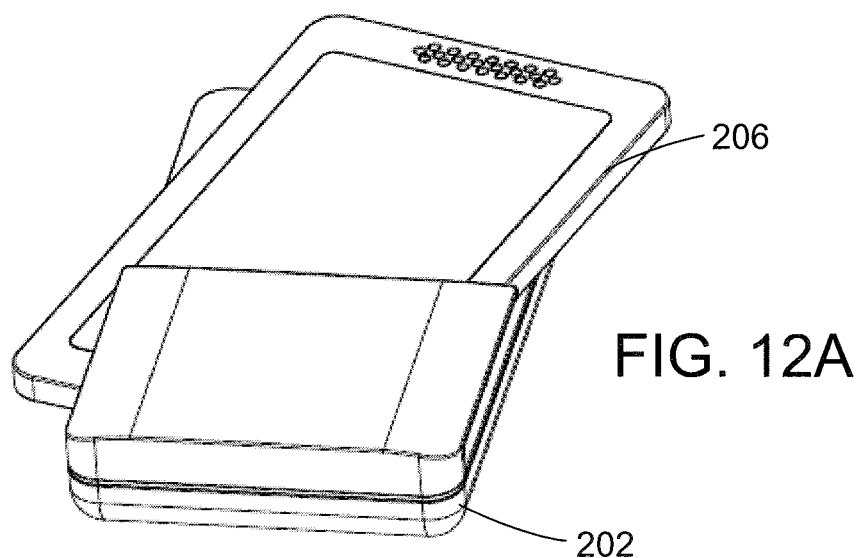
FIG. 12A
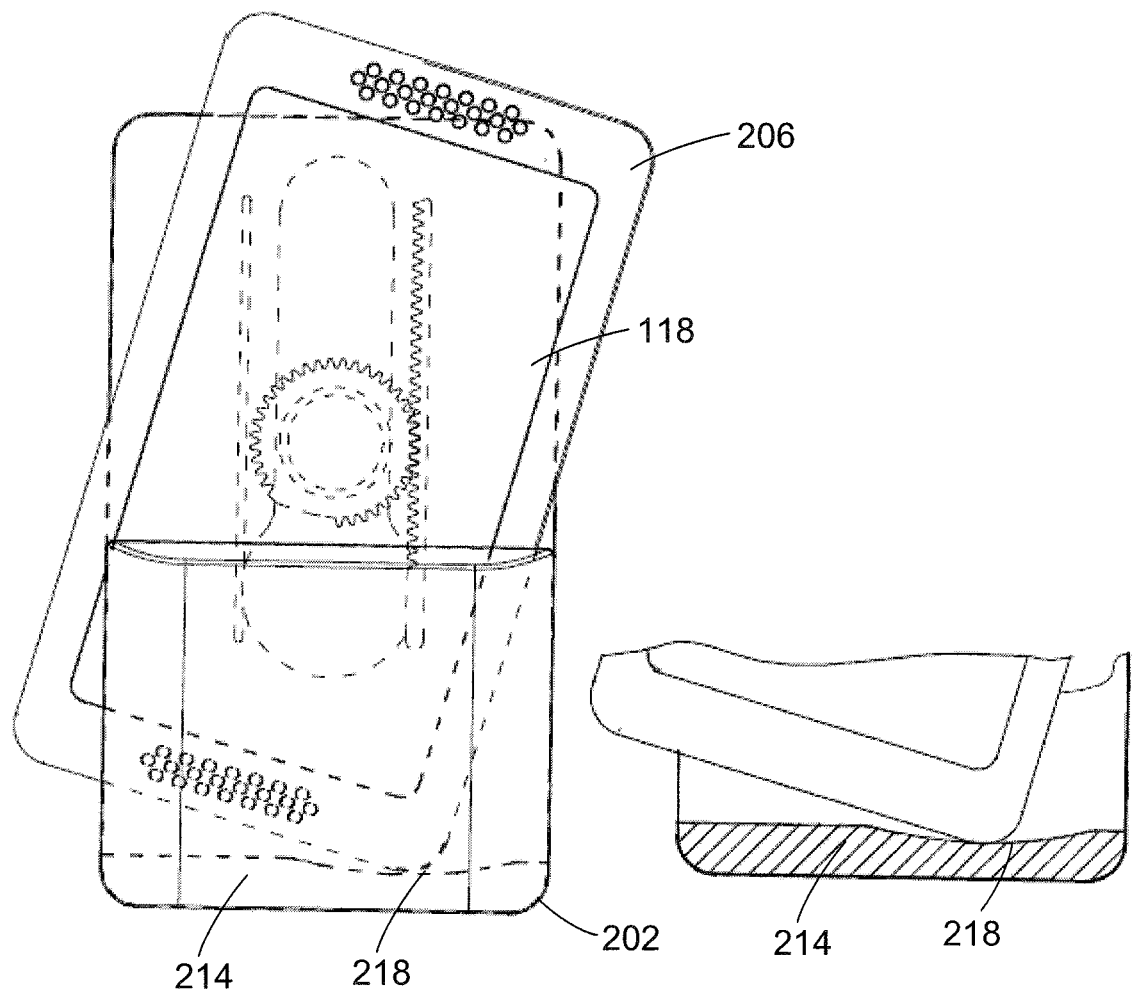
FIG. 12B
FIG. 12C

HANDHELD ELECTRONIC COMMUNICATION DEVICE INCLUDING TOUCH-SENSITIVE DISPLAY AND METHOD

FIELD OF TECHNOLOGY

The present disclosure relates to handheld electronic communication devices including a touch-sensitive display.

BACKGROUND

Electronic devices, including handheld electronic communication devices, have gained widespread use and may provide a variety of functions including, for example, telephonic, electronic text messaging and other personal information manager (PIM) application functions. Handheld electronic communication devices can include several types of devices including mobile stations such as simple cellular phones and smart phones.

Devices such as smart phones are generally intended for handheld use and ease of portability. Smaller devices are generally desirable for portability. Touch-sensitive devices constructed of a display, such as a liquid crystal display (LCD), with a touch-sensitive overlay are useful on such handheld devices as such handheld devices are small and are therefore limited in space available for user input and output devices. Further, the screen content on the touch-sensitive devices can be modified depending on the functions and operations being performed.

BRIEF DESCRIPTION OF THE DRAWINGS

Embodiments of the present disclosure will now be described, by way of example only, with reference to the attached Figures, wherein:

FIG. 12A, FIGS. 12B, and 12C show a perspective view, a top view illustrating hidden detail, and a partial sectional view, respectively, of the portable electronic communication device with the display assembly between a first position and a third position;

DETAILED DESCRIPTION

Figure 1:
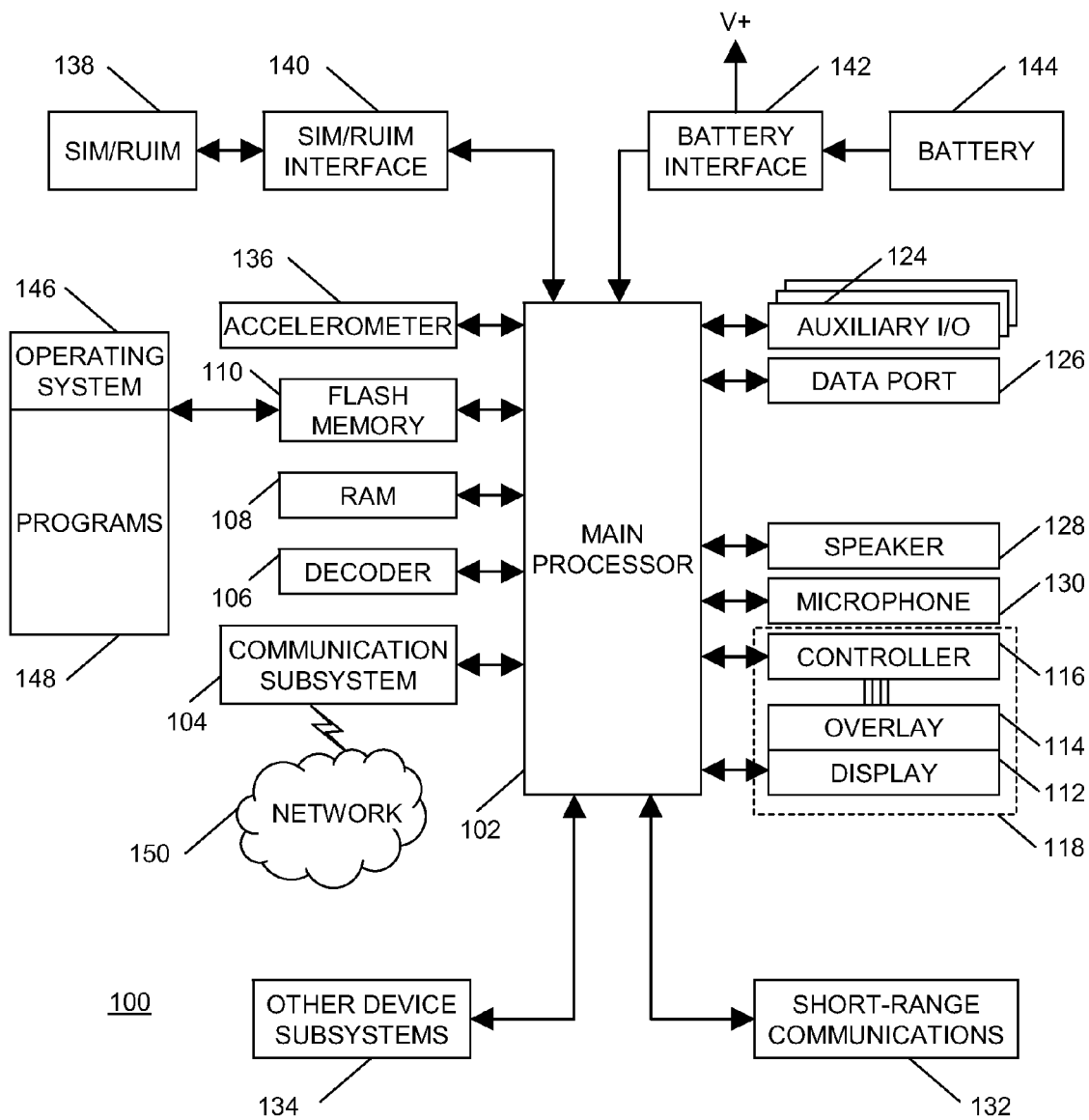
FIG. 1 is a simplified block diagram of components including internal components of a handheld electronic communication device according to an example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

Referring first to FIG. 1, a block diagram of components of the handheld electronic communication device 100 is shown. The handheld electronic communication device 100 includes multiple components such as a processor 102 that controls the operations of the handheld electronic communication device 100. Communication functions, including data and voice communications, are performed through a communication subsystem 104. Data received by the handheld electronic communication device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The handheld electronic communication device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an auxiliary input/output (I/O) subsystem 124, a data port 126, a speaker 128, a microphone 130, short-range communications 132 and other device subsystems 134. User-interaction with the graphical user interface is performed through the touch-sensitive overlay 114. The processor 102 interacts with the touch-sensitive overlay 114 via the electronic controller 116. Information, such as text, characters, symbols, images, icons, and other features that may be displayed or rendered on a handheld electronic communication device, are displayed on the touch-sensitive display 118 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces. Although the touch-sensitive display 118 is described as comprising a display 112 and an overlay 114, the touch-sensing components may overlay the display 112 or, alternatively, may be integrated into the display 112.

To identify a subscriber for network access according to the present embodiment, the handheld electronic communication device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The handheld electronic communication device 100 also includes an operating system 146 and software components 148 that are executed by the processor 102 and are typically stored in a persistent store such as flash memory 110. Additional applications may be loaded onto the handheld electronic communication device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the handheld electronic communication device 100 is similar. The speaker 128 outputs audible information converted from electrical signals, and the microphone 130 converts audible information into electrical signals for processing.

Figure 2:
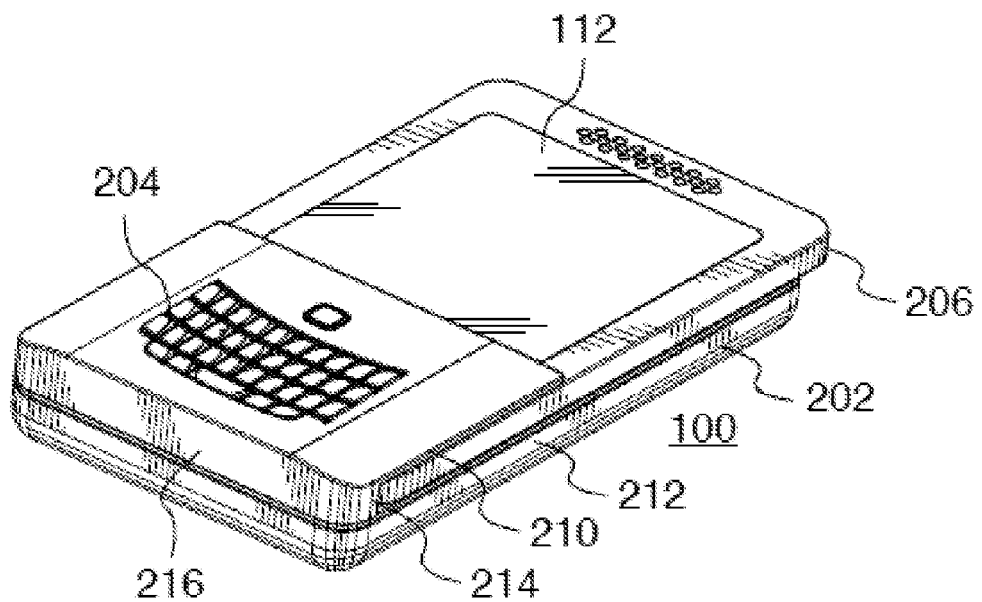
FIG. 2 is a perspective view of an example of a handheld electronic communication device including a display assembly in a first position.
Figure 3:
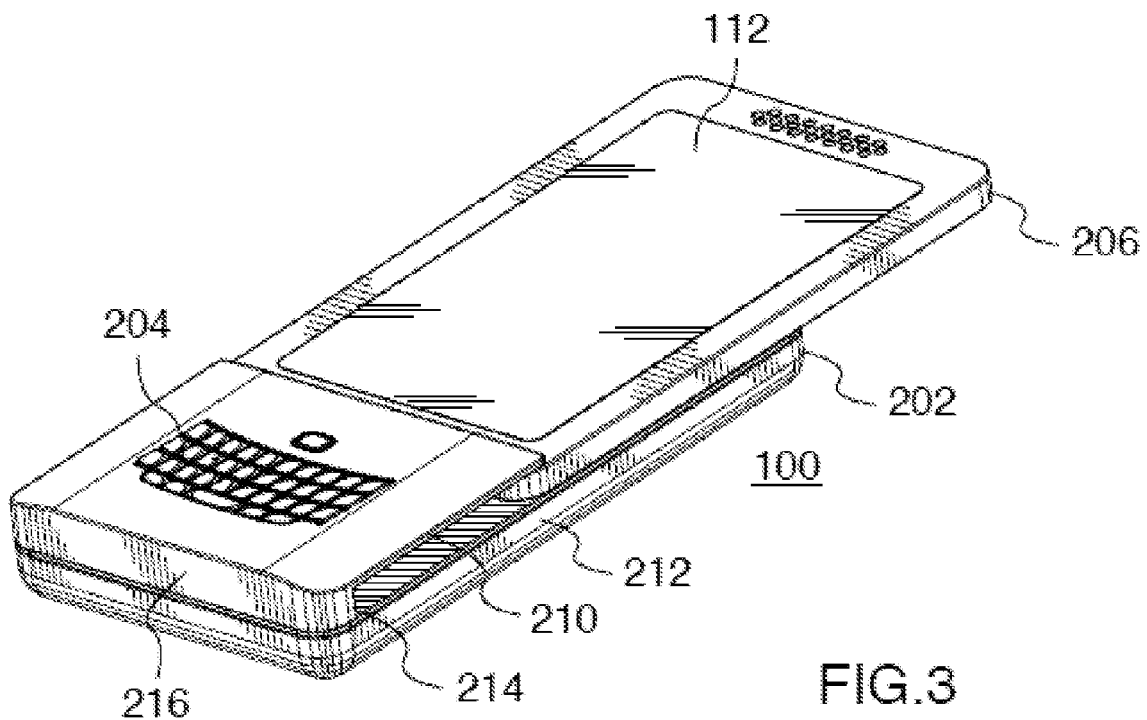
FIG. 3 is a perspective view of the example handheld electronic communication device of FIG. 2, with the display assembly in a second position.
Figure 4:
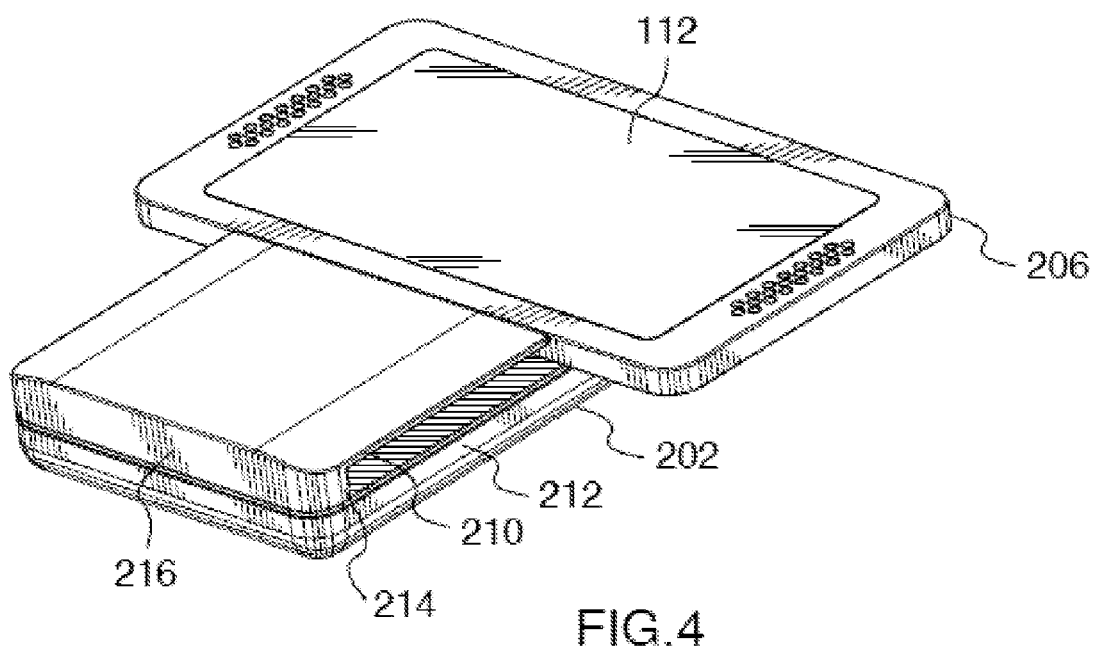
FIG. 4 is a perspective view of the example handheld electronic communication device of FIG. 2, with the display assembly in a third position, intermediate the first position and the second position.

Referring to FIG. 2 and FIG. 3, perspective views of an example of the handheld electronic communication device 100 is shown. The handheld electronic communication device 100 generally includes a body 202 that has an input device 204, and a display assembly 206 that includes a display 112. The display assembly 206 is connected to the body 202 and moveable relative to the body 202, between a first position shown in FIG. 2 in which a first portion of the display 112 is covered by the body 202 and a second portion of the display 112 extends from the body 202, and a second position shown in FIG. 3 in which the first portion and the second portion of the display 112 are exposed. The display 112 is in a portrait orientation relative to the front 210 of the body 202 in that the width of the display in the portrait orientation is less than the length of the display 112. The display assembly 206 is also moveable into a third position that is intermediate the first position and the second position and is shown in FIG. 4. When the display assembly 206 is in the third position, the first and second portion of the display 112 are exposed and the display is in a landscape orientation. The display assembly 206 is rotated into the third position, from either the first position or the second position. In the landscape orientation, the display is rotated such that the width of the display 112 is greater than the length.

The body 202 includes a back 212 and a front 210 spaced from the back 212 by a flange 214 that extends between and connects the back 212 and the front 210. The flange 214 is unitary with the front 210 and is connected to the back 212 at a closed end 216 of the body 202. The flange 214 is suitably sized to provide a space between the front 210 and the back 212 in which the display assembly 206 is movable into and out of.

The front 210 of the body 202 extends generally parallel to the back 212, and the front 210 includes the input device 204, which may be, for example, a keyboard, as shown in FIG. 2, FIG. 3, and FIG. 4. Alternatively, the input device 204 may be a keypad, a touch-sensitive pad, or trackpad, a touch-sensitive display, or any other suitable device for input. The input device 204 is exposed for use in FIG. 2, FIG. 3, and FIG. 4.

The front 210 extends less than half the distance from the flange 214 as compared to the distance that the back 212 extends from the flange 214 and the front 210 and back 212 are connected by the flange 214 at the closed end 216 of the body. In the present example, the front 210, the flange 214 and the back 212 form a pocket with open sides to receive the display assembly 206. Alternatively, one side of the pocket may be closed by, for example, a side flange. In still another alternative, the side of the pocket from which the display assembly 206 enters and exits the pocket, may include, for example, a door that is biased into the closed position and opens when the display assembly is moved out of or into the first position.

Figure 5:
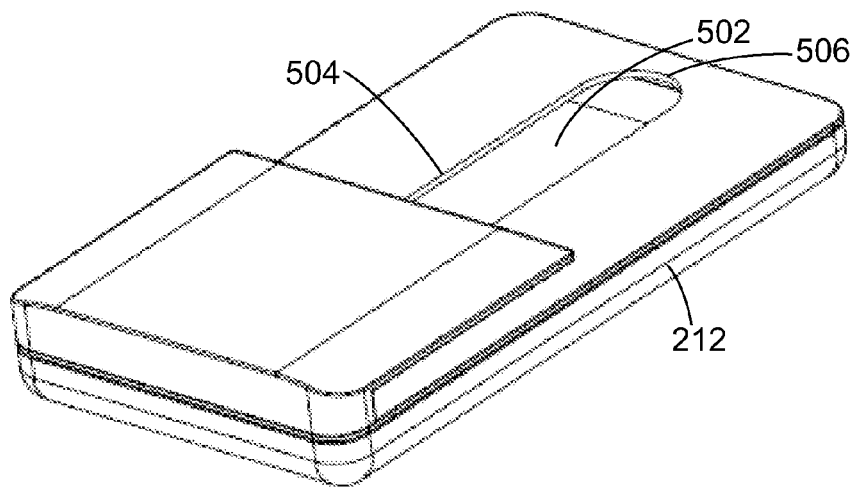
FIG. 5 is a perspective view of a body of the example handheld electronic communication device of FIG. 2, without the display assembly.
Figure 6:
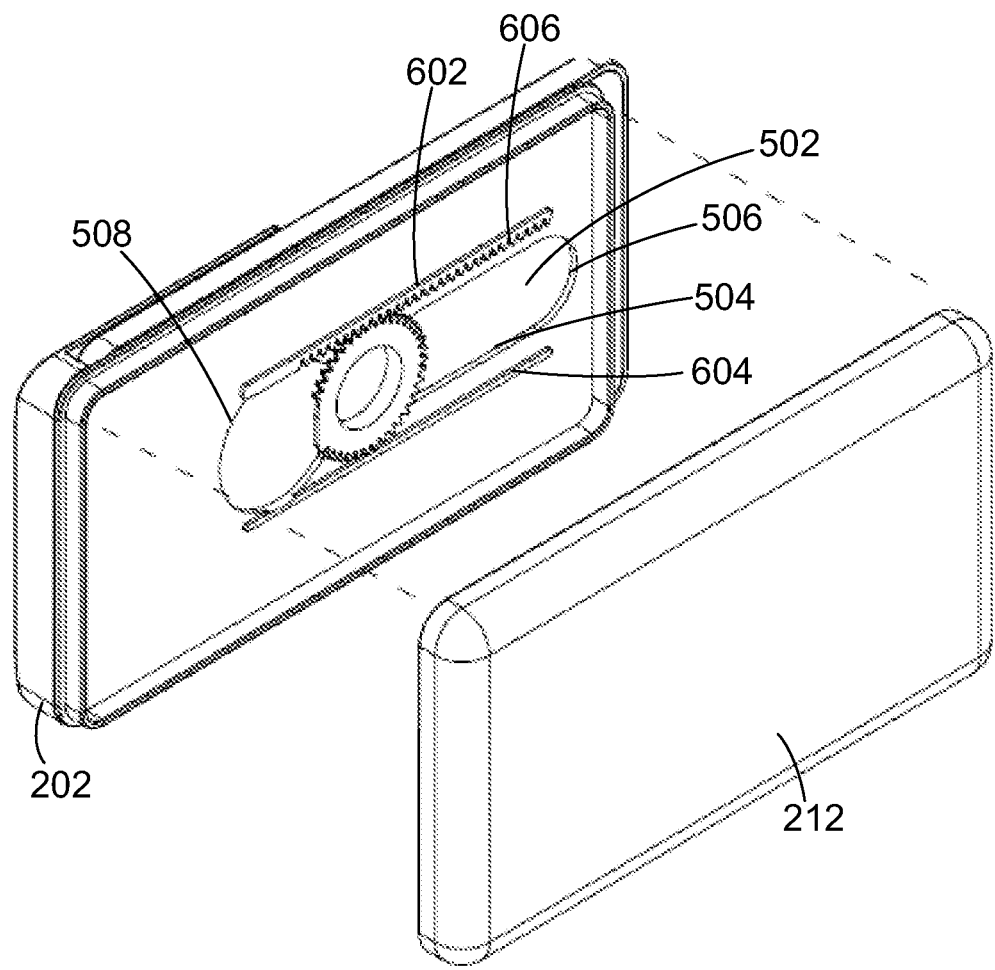
FIG. 6 is a perspective view of the example handheld electronic communication device of FIG. 2 with a portion of the back removed to show hidden detail.

Referring now to FIG. 5, the back 212 of the body 202 includes a slot 502 that includes sides 504 that extend generally parallel with the sides of the back 212. The slot 502 has a semicircular 506 end with a diameter that is about equal to the shortest distance between the sides 504. Thus, the sides 504 extend generally tangentially from the semicircular end 506. The opposite end of the slot 502 is a larger semicircular end 508 with a diameter that is greater than the diameter of the semicircular end 506. The larger semicircular end 508 is sized to receive a pinion through the slot 502 during assembly of the handheld electronic communication device 100. As shown in FIG. 6, a rack 602 extends parallel to and near one side 504 of the slot 502 and a guide 604 extends parallel to and near the other side 504 of the slot 502. The rack 602 includes teeth 606 to engage with teeth on a pinion, or generally round gear, that extends from the display assembly 206 and the guide 604 maintains the pinion in engagement with the rack 602. The rack and pinion may be constructed of any suitable material, such as, for example, polyacetal, nylon, ultra high molecular weight polyethylene, or metal, such as magnesium, steel, aluminum, or any other suitable material.

Figure 7:
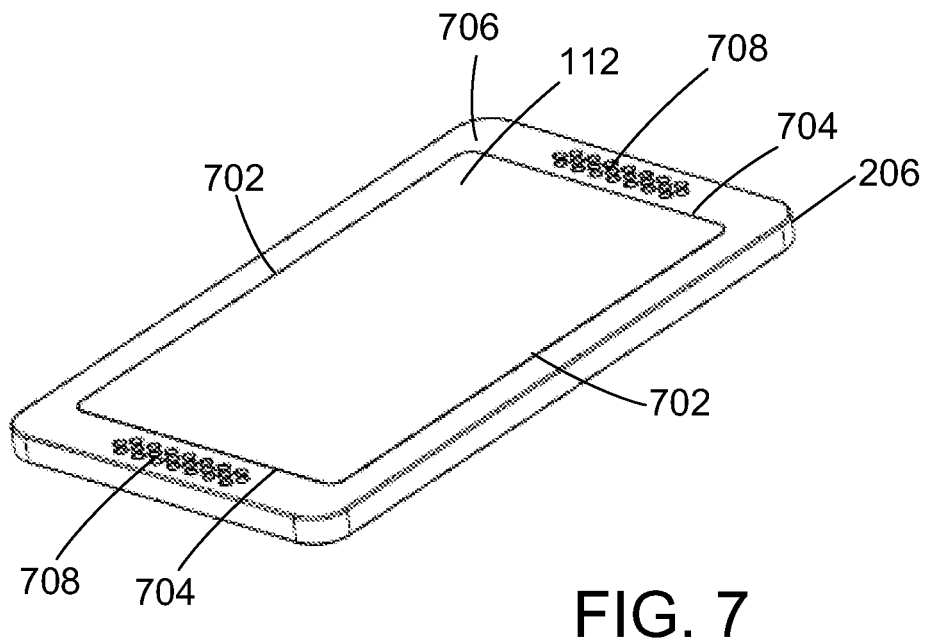
FIG. 7 is a perspective view of the display assembly of the example handheld electronic communication device of FIG. 2.

Referring now to FIG. 7, the display assembly 206 includes the display 112 which may be an LCD display. Optional components including a backlight may also be included. The display 112 in the present example, is part of the touch-sensitive display 118, including the touch-sensitive overlay 114 to detect touches thereon. The display 112 is generally rectangular with opposing parallel long sides 702 and opposing parallel short sides 704. The display assembly 112 is housed in a display housing 706 that is also generally rectangular and, in the example shown, includes speakers 708 adjacent each short side 704 of the display 112.

Figure 8:
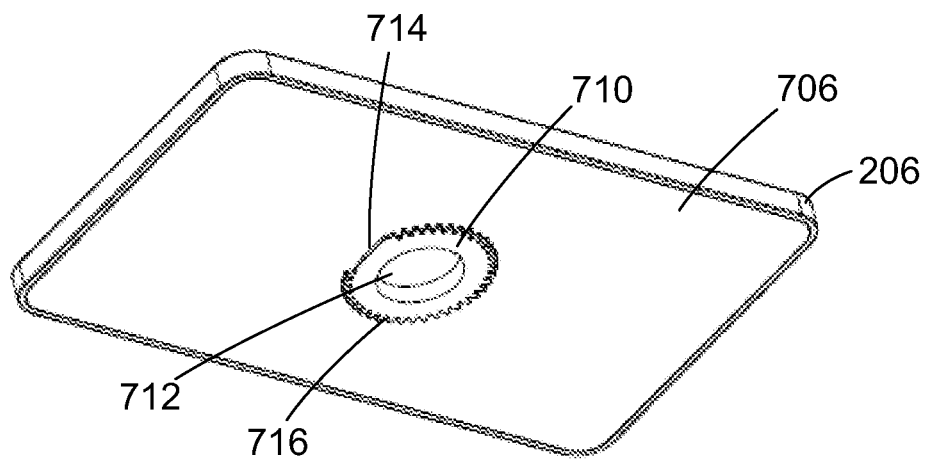
FIG. 8 is an alternative perspective view of the display assembly of the example handheld electronic communication device of FIG. 2.

Referring to FIG. 8, a pinion 710, or generally round gear, extends from a backside of the display housing 706. The pinion 710 extends on a cylindrical spacer 712 that is smaller in diameter than the pinion 710 such that the pinion 710 is spaced from the backside of the display housing 706. Teeth 716 on the pinion 710 are sized and shaped to cooperate with the teeth 606 of the rack 602 at the back 212 of the body 202. The spacer 712 provides a passageway therethrough to facilitate connection of components of the display assembly 206 with components of the body 202. The spacer 712 and pinion 710 are rotatable relative to the display housing 706. The spacer 712 and pinion 710 may be integrally molded with the display housing 706 or may be attached to the display housing 706 by any other suitable means. In the present example, the pinion 710 includes a stop 714 that is located adjacent the guide 604 when the display assembly 206 is in the third position, intermediate the first position and the second position. The stop 714 includes a portion of the pinion 710 absent teeth and a leading edge that 715 abuts and applies a force against the guide 604 when moving from the first position into the third position. A force is therefore applied to overcome the force of the edge 715 on the guide 604 to move the display assembly 206 into the third position. Similarly, the edge 715 abuts guide 604 when moving from the third position into the third position. A Force is therefore applied to overcome the force of the edge 715 on the guide 604 to move the display assembly 206 out of the third position, toward the first position. The stop 714 facilitates positioning of the display assembly 206 in the third position as the stop 714 maintains the display assembly 206 in the third position until sufficient force is applied during rotation of the display assembly 206 to move the display assembly 206 out of the third position. The stop 714 also provides a "click" or tactile feedback to the user when the display assembly 206 is rotated into and out of the third position.

Optionally, detents may be provided, for example, adjacent the slot, to facilitate movement of the display assembly 206 into each of the first, second, and third positions or into any one or combination of these positions.

The body 202 and the display assembly 206 may both house components of the handheld electronic communication device 100, including the components described and shown in FIG. 1.

In the assembled state, the display assembly 26 is connected to the back 212 of the body 202 and rotates about the body 202 as the spacer 712 extends through the slot 502 and the teeth 716 of the pinion 710 engage with the teeth 606 of the rack 602. The rotation of the display assembly 206 relative to the body 202 is accompanied by a displacement or translation of the display assembly 206 relative to the body 202 as the display assembly moves along the slot 502 with rotation. The display assembly 206 therefore is displaced, relative to the body 202, along the slot 502 as the display assembly 206 rotates, relative to the body 202, along the rack 602.

As described above, the display assembly 206 is moveable relative to the body 202, between a first position shown in FIG. 2, the position shown in FIG. 4 and the position shown in FIG. 3. In the position shown in FIG. 2, the display assembly 206 is received in the pocket in the body 202, a first portion of the display 112 is covered by the body 202 and a second portion of the display 112 extends from the body 202. In the third position shown in FIG. 4, and intermediate the first position and the second position, the entire display 112 is exposed and the display 112 is in the landscape orientation such that the long sides 702 of the display 112 are generally parallel to the end 216 of the body 202. In the second position shown in FIG. 3, the entire display 112, including the first portion and the second portion of the display 112, is exposed and the display 112 is in the portrait orientation relative to the front 210 of the body 202 such that the short sides 704 of the display 112 are generally parallel to the end 216 of the body 202.

Referring again to FIG. 2, FIG. 3 and FIG. 4, movement of the display assembly 206 relative to the body 202 will now be described. The display assembly 206 may be disposed in the pocket of the body 202 as shown in FIG. 2. In this orientation the second portion of the display 112, which is the portion shown in FIG. 2 that is exposed, may be utilized for displaying information. The first portion of the display 112 is covered by the input device 204 and is therefore not utilized for displaying information. The display assembly 206 may be moved relative to the body 202, from the first position to the third position and then to the second position or from the first position to the second position.

Figure 9:
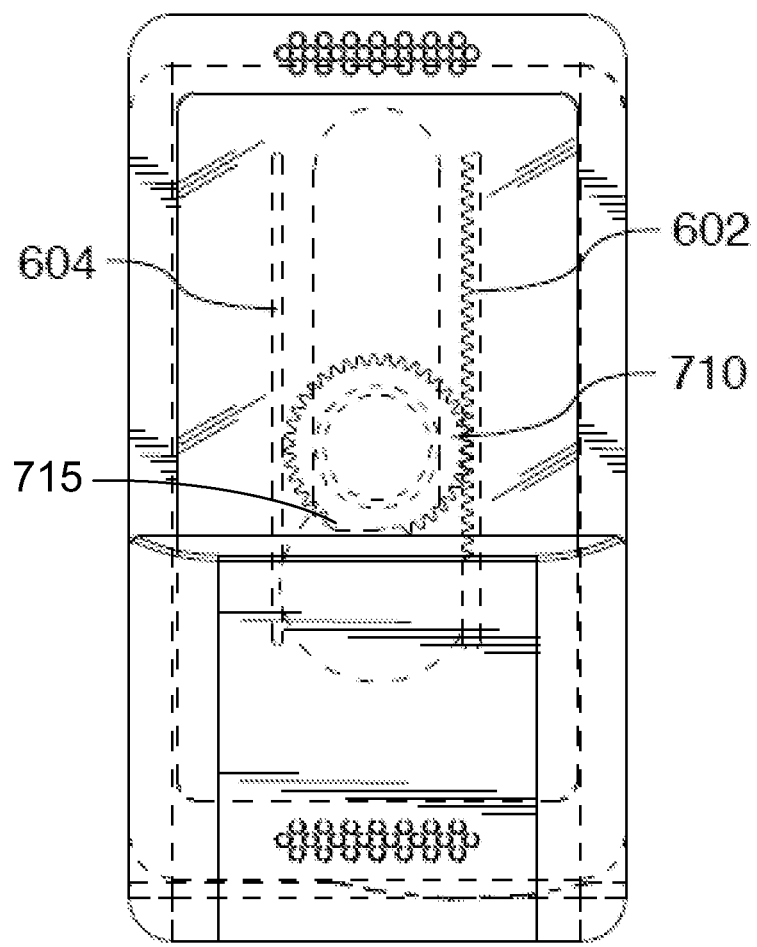
FIG. 9 is a front view of the example handheld electronic communication device of FIG. 2 in the first position, showing hidden detail in ghost outline.
Figure 10:
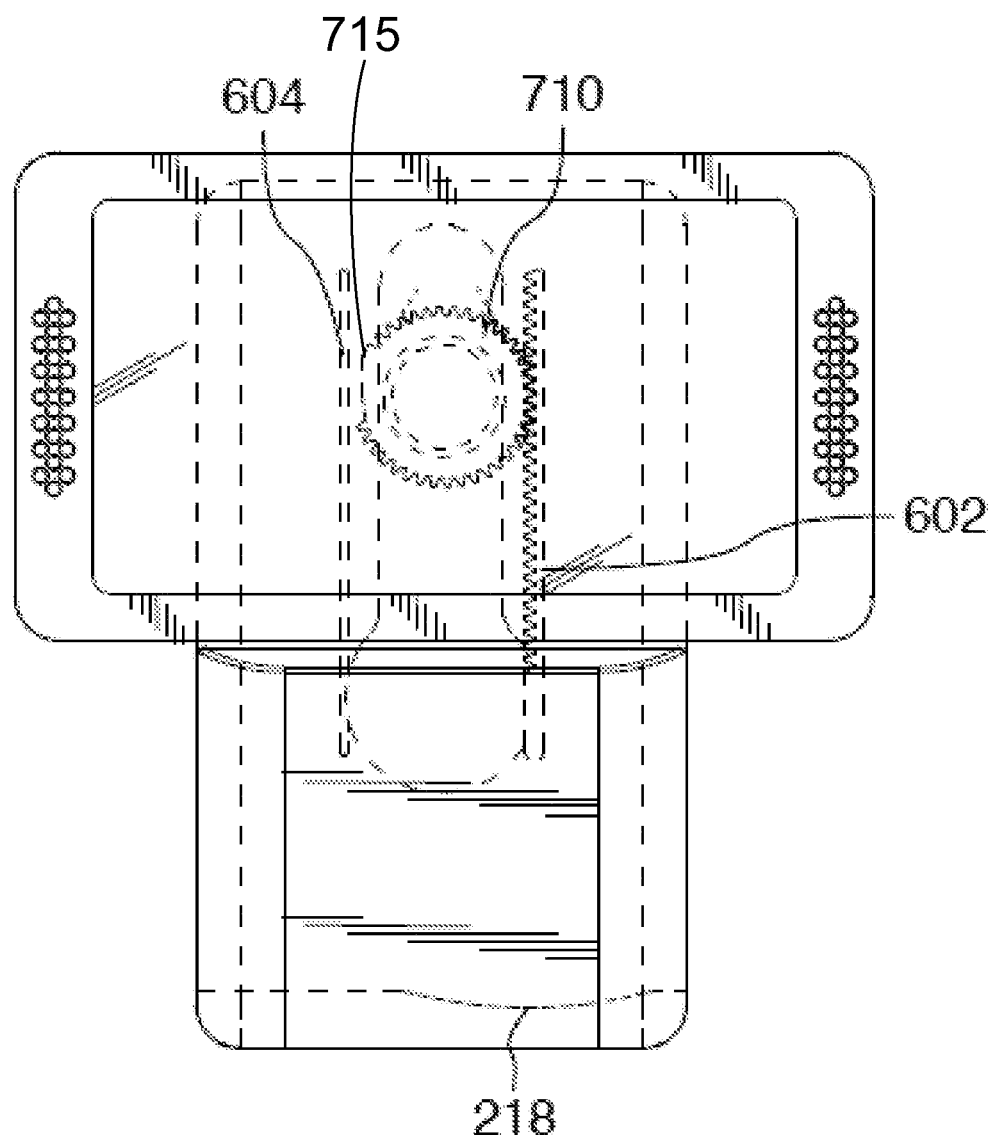
FIG. 10 is a front view of the example handheld electronic communication device of FIG. 2 in the second position, showing hidden detail in ghost outline.
Figure 11:
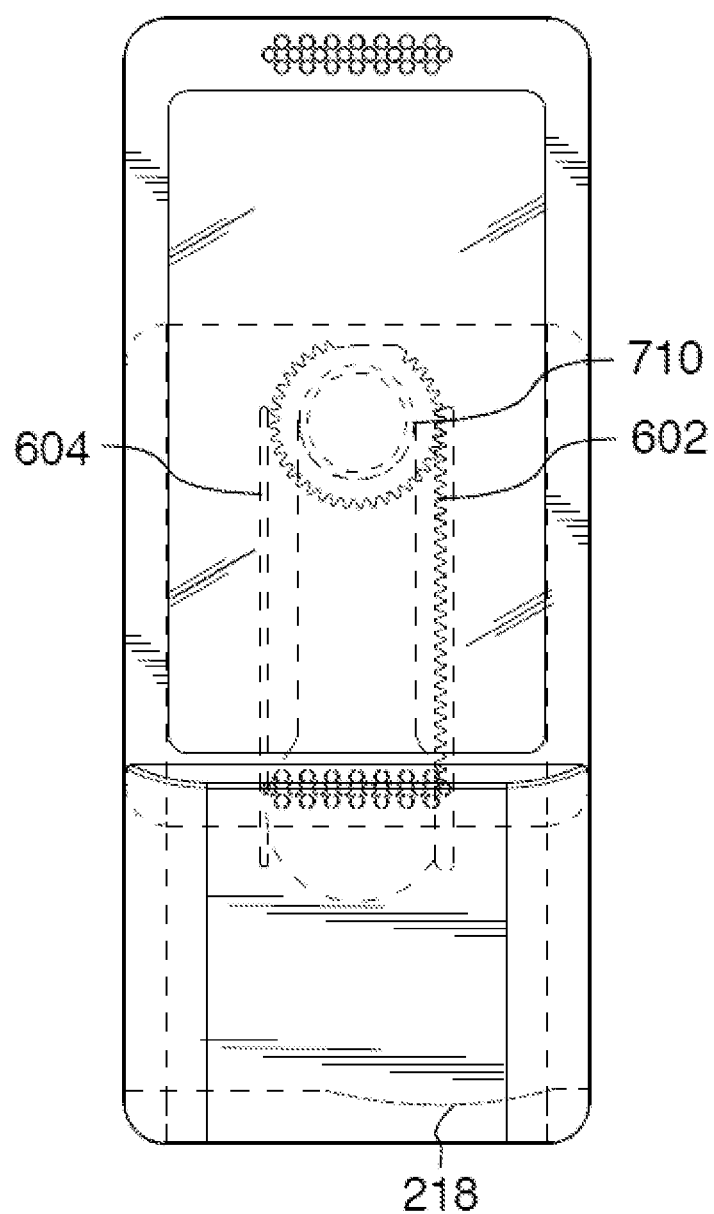
FIG. 11 is a front view of the example handheld electronic communication device of FIG. 2 in the third position, showing hidden detail in ghost outline.

To move from the first position to the third position, the display assembly 206 is rotated out of the pocket, as the pinion 710 rotates along the rack 602 and the display assembly 206 is displaced, or translated, along the slot 502, from the position shown in FIG. 9 to the position shown in FIG. 10, such that the display 112 is generally transverse to the orientation of the display 112 in the first position. The entire display 112 may be utilized for displaying information in a landscape orientation when the display assembly 206 is in the third position. The accelerometer 136 may be disposed in the display assembly 206 to determine the orientation of the display assembly 206 and to display information in a corresponding orientation of the display 112. To move to the second position, the display assembly 206 is further rotated, and thus further translated along the slot 502, out of the third position such that the short sides 704 of the display 112 are generally parallel with the end 216 of the body 202. Thus, in the second position shown in FIG. 11, the display 112 is displaced generally linearly along the slot 502, relative to the first position shown in FIG. 9. In the second position, shown in FIG. 11, the entire display 112 may be utilized for displaying information in a portrait orientation. Although described as a landscape orientation in FIG. 10 and a portrait orientation in FIG. 11, the handheld electronic communication device may be held in any suitable orientation and may depend on the use of the device when the display device is in the positions shown.

To return the display assembly 206 to the first position, the display assembly 206 is rotated in the reverse direction and thus displaced, or translated, in the reverse direction along the slot 502.

The flange 214 includes a semi-circular wall 218 on one side of the flange 214 inside the pocket. The semi-circular wall 218 provides a depressed portion of the flange 214 to facilitate movement of a corner of the display assembly 206 past the flange 214 during rotation and translation of the display assembly 206 out of the first position as shown in FIG. 12A, FIG. 12B, and FIG. 12C.

As indicated above, the display 112 is part of a touch-sensitive display 118. The touch-sensitive overlay 114 of the touch-sensitive display 118 may be selectively operable such that the touch-sensitive overlay 114 is activated or operable in at least one of the positions of the display assembly 206 and not activated or inoperable in at least one of the other positions of the display assembly 206. For example, the touch-sensitive overlay 114 may be inoperable when the display assembly 206 is in the first position. The touch-sensitive overlay may be operable when the display assembly 206 is in the second position. Many different devices may be utilized for detection of the position of the display assembly 206 relative to the body 202. For example, a Hall effect sensor may be utilized to detect a position or positions of the display assembly 206 relative to the body 202. According to another example, a mechanical switch or switches are utilized.

Figure 13:
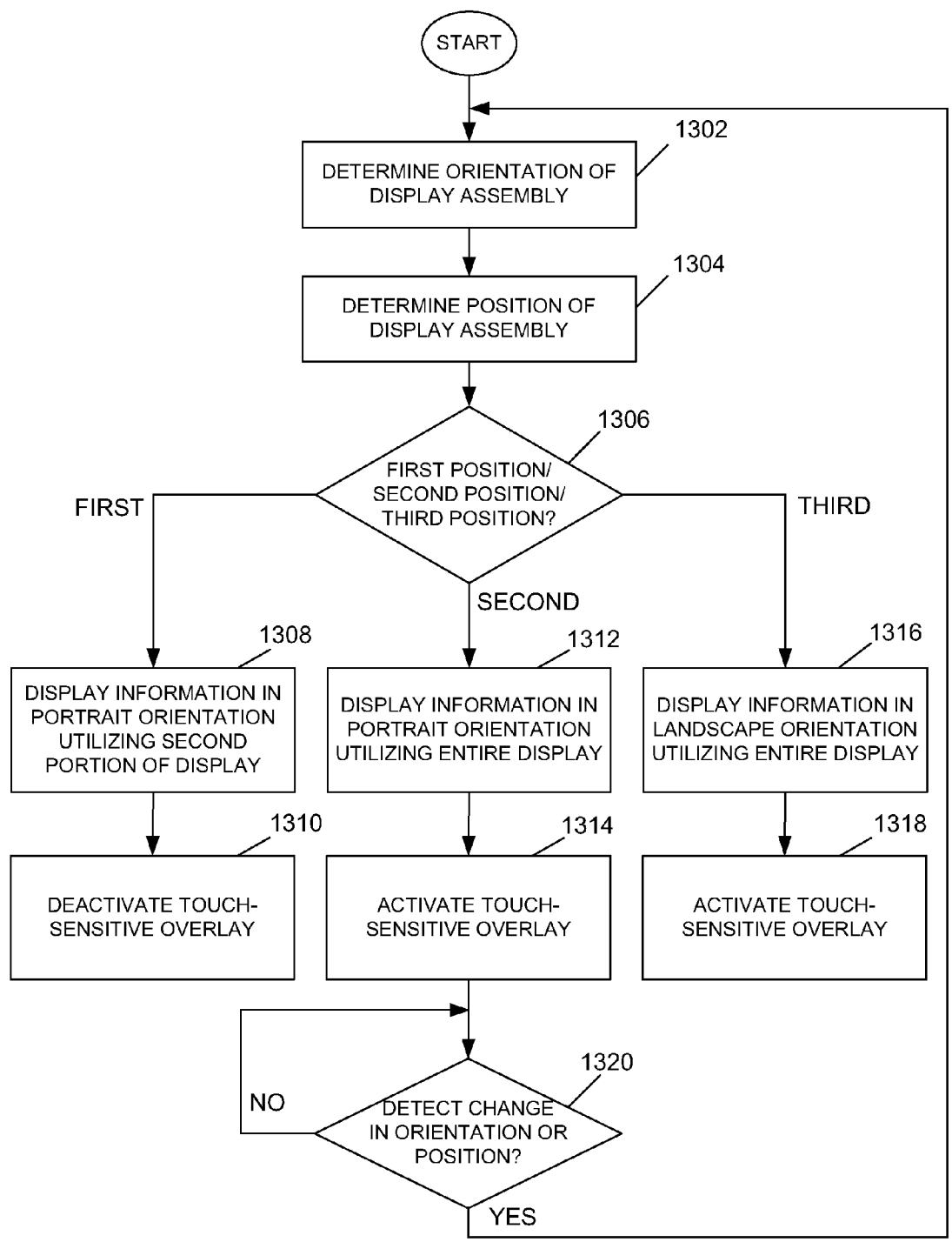
FIG. 13 is a flowchart illustrating a method of controlling a handheld electronic communication device.

Referring to FIG. 13, a flow chart illustrating a method of controlling the handheld electronic communication device 100 is shown. The method may be carried out by software executed, for example, by the processor 102. Coding of software for carrying out such a method is within the scope of a person of ordinary skill in the art given the present description. The method may contain additional or fewer processes than shown and/or described, and may be performed in a different order.

The method starts when the handheld electronic communication device 100 is turned on or in the awake state and the orientation of the display assembly 206 is determined 1302. The orientation may be determined utilizing the accelerometer 136 or may be determined utilizing any other suitable device. Rather than determining orientation based on the accelerometer 136, the orientation of the display assembly 206 relative to the back 212 may be determined. The position of the display assembly 206 is determined at 1304. In this example, determination of the position of the display assembly and the orientation are shown as separate processes. The position and the relative orientation may be determined in a single process, however. When the display assembly 206 is in the first position at 1306, information is displayed 1308 on the portion of the display 112 that is exposed and touch-sensing is inoperable 1310. When the display assembly 206 is in the second position at 1306, the information is displayed 1312 in the portrait orientation, utilizing the entire display 112 and the touch-sensing 112 utilizing the touch-sensitive display 118 is operable 1314. When the display assembly 206 is in the third position at 1306, the entire display is utilized for displaying 1316 information in the landscape orientation, and the touch-sensing is operable 1318. When a change in the orientation or position of the display 112 is detected at 1320, the process continues at 1302.

Figure 14:
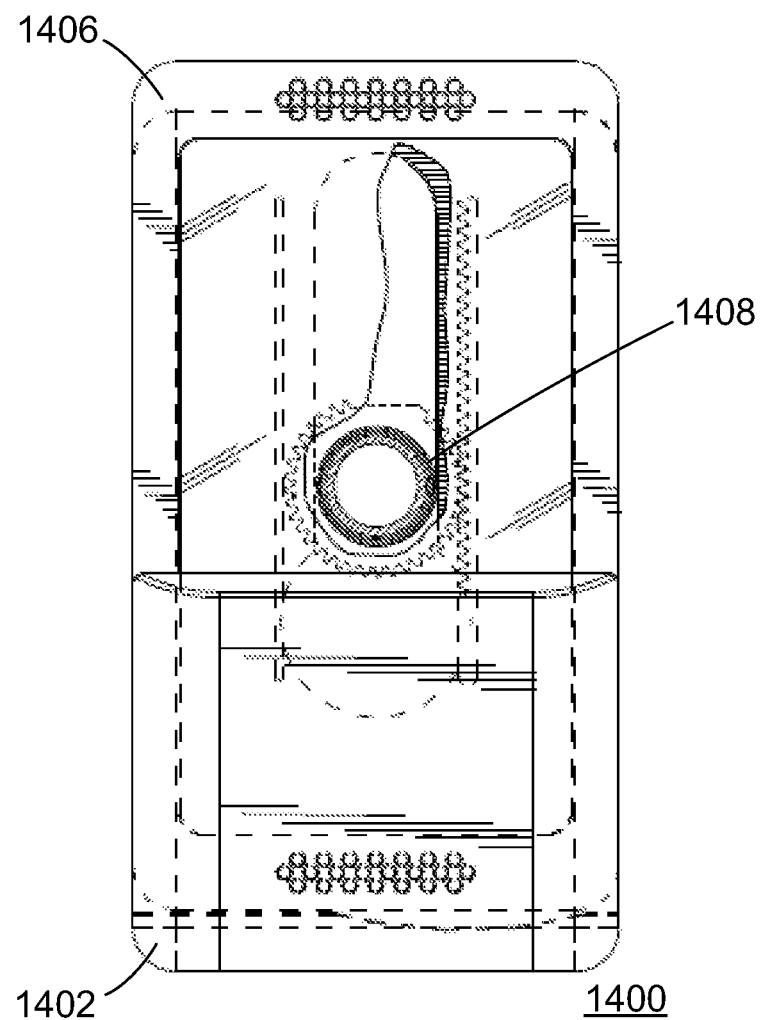
FIG. 14 is a perspective view of an alternative example of a handheld electronic communication device.

Reference is now made to FIG. 14 to describe an alternative embodiment of the handheld electronic communication device. The handheld electronic communication device 1400 is similar to the handheld electronic communication device 100 described above and therefore the features of the device are not described again herein. In the present example, however, the handheld electronic communication device 1400 includes a coil spring 1408 cooperating between the display assembly 1406 and the body 1402 to bias the display assembly 1406 into the second position, for example. The coil spring 1408 is fixed, at one end, to the display assembly 1406 and, at the other end, to the body 1402 such that the coil spring 1408 is coiled between a back of the display and a back of the pinion when the handheld electronic communication device 1400 is in the second position and extends when the display assembly is moved out of the second position, toward the third position. The display assembly 1406 is biased by the coil spring 1408 such that movement out of the first position to the third position and movement from the third position to the second position is facilitated by the coil spring 1408.

Optionally, the portion of the display 112 that is hidden when the handheld electronic communication device 100 is in use with the display assembly 206 in the first position, may be turned off or may be utilized to display a color that consumes less power to save battery power.

In the embodiments shown and described herein, the input device is exposed for use in each position of the display assembly. Alternatively, the input device may be concealed behind the display assembly when the display assembly is in the first position and exposed when the display assembly is in the second and third positions. The input device may be disposed behind the display assembly and may be exposed for use when the display assembly is moved from the first position into the second position. The input device may be biased to move outwardly when the display assembly is moved from the first position into the second position such that the input device is generally flush with the display screen when the display assembly is in the second or the third positions.

The handheld electronic communication device 100 described herein includes multiple positions of the display assembly relative to the body. Thus, the display assembly is moveable relative to the body to provide different device forms, commonly referred to as form factors. The positions provide a display with a keyboard, an extended portrait orientation display with the keyboard and a landscape view of the display with the keyboard. Thus, the handheld electronic communication device may be stored or utilized in a compact position and the screen may be fully exposed for viewing more information at one time while still providing a keyboard or other input device. Further, the orientation of the display can be selected based on the type of information displayed.

According to one aspect, a handheld electronic communication device is provided. The handheld electronic communication device includes a body that has an input device, and a display assembly including a display, the display assembly connected to the body and rotatable relative to the body, between a first position in which a first portion of the display is covered by the body and a second portion of the display extends from the body, and a second position in which the display is displaced generally linearly relative to the first position such that the first portion and the second portion of the display are exposed.

According to another aspect, a method of controlling a handheld electronic communication device is provided. The handheld electronic communication device includes a body that has an input device, and a display assembly including a touch-sensitive display. The display assembly is connected to the body and rotatable relative to the body, between a first position in which a first portion of the touch-sensitive display is covered by the body and a second portion of the touch-sensitive display extends from the body, and a second position in which the first portion and the second portion of the touch-sensitive display are exposed. The method includes activating touch-sensing utilizing the touch-sensitive display to detect a touch thereon when the display assembly is moved from the first position to the second position, and deactivating the touch-sensing when the display assembly is moved from the second position to the first position.

While the embodiments described herein are directed to particular implementations of the actuating assembly and the handheld electronic communication device and the, it will be understood that modifications and variations may occur to those skilled in the art. All such modifications and variations are believed to be within the sphere and scope of the present disclosure.

What is claimed is:

1. A handheld electronic communication device comprising:
   a body comprising an input device and a first end;
   a display assembly comprising a first side and a display, the display assembly connected to the body by a rack and pinion mechanism, and rotatable relative to the body from a first position in which a first portion of the display is covered by the body and a second portion of the display extends from the body and the first side is parallel with the first end, to a second position in which the display is displaced generally linearly relative to the first position such that the first portion and the second portion of the display are exposed and the first side is parallel with the first end.

2. The handheld electronic communication device according to claim 1, wherein the display assembly comprises the pinion and the body comprises the rack.

* * * * *